Patented Aug. 25, 1936

2,052,175

UNITED STATES PATENT OFFICE 2,052,175

POWDERED COLORING MATERIAL

Carl H. Haurand, North Plainfield, N. J., assignor to The Best Foods, Inc., New York, N. Y., a corporation of Delaware No Drawing. Application August 3, 1933, Serial No. 683,475

3 Claims. (Cl. 99—148)

This invention relates to a coloring material which may be applied in a dry, powdered form to butter, margarine, or other edible fatty materials, such, for example, as shortening, in order to change the color of the same.

In the distribution of butter substitutes, it is the practice to include with the package a coloring material which may be mixed with the butter substitute by the consumer in order to give the product the color of natural butter. In some cases it is also desirable to intensify the color of natural butter. Oil soluble dyes have been used for these purposes and attempts have been made to use certain starches, sugars and salts as the carrying agent for the dye. Difficulties have been encountered, however, in handling such ingredients in the machines used for forming the pellets or wafers of the coloring material, on account of the abrasive and sticking action of the ingredients and their hygroscopic characteristics.

It is an object of the present invention to provide an improved coloring material which may be pressed into small pellets or wafers and enclosed in a celluloid, paper or other suitable envelope to be wrapped with the package of butter substitute or similar material. It is another object of the invention to provide such a coloring material in the form of a powder which will avoid excessive wear on the moving parts of the machine in which it is handled and which will permit smooth action and avoid binding or squeaking in the machine. It is also an object to provide a coloring material of suitable consistency for forming the pellet or wafer and which will remain of proper consistency upon standing in ordinary atmosphere. The coloring material must also be one which will not putrefy or become rancid on standing. Another object is to provide a coloring material which may be readily dispersed into the product and which will color it uniformly and smoothly without leaving specks of coloring material therein. A further object is to provide an improved coloring material for an oil and water emulsion, the coloring ingredient of which material is soluble in the oil fraction and the carrying ingredient of which is soluble in the water fraction of the product. Other objects will become apparent.

According to this invention, refined anhydrous corn sugar or pure anhydrous dextrose (for example, such as is sold under the trade name of anhydrous "Cerelose") has been found to have unusual qualities for use in this connection. A powder made up of this material, together with a suitable dye, is smooth acting and may be handled in machines without causing binding and squeaking and without excessive abrading of the metal surfaces with which it contacts in the machine, for example, the valves of the pellet machine.

The anhydrous dextrose differs from dextrose hydrate in that it crystallizes in rhombic form appearing as elongated prisms with hemihedral end surfaces. Such crystals have a melting point of 146° C. and are hard grained and powder easily. Dextrose hydrate crystallizes with one mole of water and has a melting point of 86° C. Its crystals are of the monoclinic system, being six sided plates or scales of hemimorph development.

In the commercial preparation of anhydrous dextrose the dextrose hydrate is prepared first and is redissolved. The anhydrous dextrose is obtained from the solution by recrystallization at a temperature above 58° C. This may be done by boiling the dextrose solution "to a grain", that is, to the point where crystals begin to grain out of the boiling liquor.

The anhydrous dextrose differs from ordinary sucrose in that it is less hygroscopic or is of higher "relative hygroscopicity", that is, the relative humidity of the air needed to cause moisture absorption by the sugars is higher. For example, sucrose will absorb water from the atmosphere if the relative humidity of the air at 25° C. is greater than 77.4% whereas anhydrous dextrose will not absorb moisture until the relative humidity exceeds 81.1%.

As a specific example of my improved coloring material, anhydrous pure corn sugar or "Cerelose" is finely ground, for example, until it is about 200 mesh or until substantially all of it will pass through 150 mesh bolting cloth. This finely ground dry material is then thoroughly mixed in the proportions of about 10 parts by weight of corn sugar with one part each of AB and OB dyes, or in other suitable proportions to give the desired tint. (These dyes are oil soluble aniline dyes known as benzeneazo-b-naphthylamine and ortho-tolueneazo-b-naphthylamine, respectively.) The mixture is then preferably sifted through bolting cloth of about 150 mesh in order to insure intimate mixture of the particles and freedom from large particles or lumps. This powder is then placed in a machine where it is formed into small pellets by gentle tapping and may be deposited in an indented pocket on a layer of celluloid and subsequently covered with an inverted layer of celluloid having a similar indented pocket, the two layers of celluloid being bound together by a suitable adhesive. Other means may, of course, be used for enclosing the pellets. The corn sugar is substantially tasteless and the mixed powder may be added to a butter substitute or another edible fatty product without substantially altering its flavor.

In using such a coloring material for coloring a butter substitute or a similar product, the powder is sprinkled upon the product and thoroughly mixed with it. During the mixing the water soluble carrier is dissolved in the aqueous phase and the oil soluble color or dye is dissolved in the oil fraction of the margarine, etc., permitting a uniform distribution of unmasked color throughout the oil fraction of the product. The carrying agent should be a substance of relatively low hygroscopicity, and one which is non-aggregative (that is, resistant to caking, for example, on ageing), stable against spoilage, has no objectionable flavor, is non-conducive to binding, corrosion or abrasion of closely fitted moving metallic surfaces, disperses readily and smoothly onto the mass being colored so as to permit a uniform "unmasking" of the mixed dyestuff, and one which may be readily powdered and sifted and is of a free flowing nature. Other sugars, which are hard grained and relatively non-hygroscopic and non-aggregative, may be used. Sugars such as cane sugar, which has three to five times as much affinity for water as does anhydrous corn sugar, are not suitable for this purpose. Anhydrous corn sugar, containing less than 2% water and preferably less than 1% of water, is particularly suited for this use.

It has been found that with the above ingredients and proportions the material gives satisfactory results without the addition of any oil or any lubricating or any drying or fluffing agent, although it is not intended to hereby exclude the use of such agents.

The quantity of dye may be varied depending upon the color desired and the concentration in the color wafer. For example, with a 2-pound package of butter substitute, it may be desirable to use a relatively smaller quantity of a more concentrated coloring material. This may be done by increasing the proportions of either or both of the dyes, depending upon the shade desired. Other suitable dyes or coloring materials may also be used to give the desired color, for example, butter yellow or Sudan G or the coloring principle of annatto, tumeric or the carotin of palm oil might be used for this purpose.

The oil soluble dyes specified in the example above are rather tarry and sticky and it may be desirable, with increased concentration of the dye or in using coloring materials which are more tarry and sticky, to add a drying or fluffing agent which will neutralize the tarry or sticky nature of the dye stuff. For example, 1 to 10%, by weight, finely divided magnesium carbonate may be added for this purpose. Also, other solid substances, such as powdered mica or talcum, may be added in about the same proportions as lubricants. Finely ground, dried milk sugar, when added in small quantities, may be useful as a fluffing agent and also is effective in neutralizing the electrical or static effect resulting from rubbing of the powder.

Examples of coloring materials using such a fluffing agent or lubricant are as follows, the quantities being given in parts by weight.

| | |
|---|---|
| Cerelose | 100 parts |
| AB dye | 10 parts |
| OB dye | 10 parts |
| Talcum or MgCO₃ | 2.5 parts (2%) |

A concentrated coloring material for use in a two pound package of butter substitute may be made up as follows:

| | |
|---|---|
| Cerelose | 100 parts |
| AB dye | 25 parts |
| OB dye | 25 parts |
| MgCO₃ | 4 parts (2.6%) |

On the other hand, it may be desirable to reduce the amount of dye in the coloring material, or to use a coloring material which is less tarry and sticky, in which event the powder may be too fluffy and will not stick together properly to form a pellet. This may be remedied by adding a small quantity of a binding agent such as a limpid vegetable oil, or a white neutral mineral oil, to the powder. For example, about .5 to 2 or 3% of peanut oil or mineral oil may be added for this purpose. Also, a solid oil or fat, such as coconut oil or neutral lard, may be used for this purpose. Such oil or fat may be dissolved in a solvent, such as ethyl acetate, whereupon it may be mixed with the powder and the solvent may be evaporated, if desired, by applying a draft of air. Or, a solid or liquid fat may be added by spraying it into the powder while the latter is being agitated, the solid fat being heated to reduce it to a liquid state. If the fat is sufficiently hard, for example, as in the case of a vegetable stearine, it may be powdered by itself and mixed with the other two powders. In each case the added fat or oil is for the purpose of binding the material together or acting as a lubricant and does not serve to dissolve the dye.

The following is an example of a coloring material using such a binding agent:

| | |
|---|---|
| Cerelose | 96 parts |
| AB dye | 7 parts |
| OB dye | 7 parts |
| Cocoanut oil | 1 part (0.9%) |

Although specific examples of proportions, ingredients and uses have been given as illustrative, it is not intended to restrict the procedure to the particular examples given or to the particular embodiments described. The selection and proportions of the ingredients may, of course, be varied to meet patricular conditions of use and the availability of the ingredients. The finished powder should be sufficiently free-flowing to be readily handled in the machine and pourable from the envelope but should not be so fluffy that it will blow away. Also, it is preferable for the powder to have the required degree of stickiness so as to cohere sufficiently to form a pellet in the particular machine used for preparing it for the envelope.

The terms used in describing and claiming the invention have been used in their descriptive sense and not as terms of limitation and it is intended that all equivalents thereof be included within the scope of the appended claims.

What I claim is:

1. A powdered coloring material comprising a coloring ingredient and a carrier therefor consisting substantially of finely divided anhydrous dextrose.

2. A dry coloring material for use in coloring fatty materials comprising an oil soluble dye and finely divided anhydrous dextrose.

3. A coloring material for use in coloring butter substitutes, comprising about ten parts by weight of anhydrous corn sugar and two parts by weight of AB and OB dyes in such proportions as to give the desired shade.

CARL H. HAURAND.